Figures 1, 2:
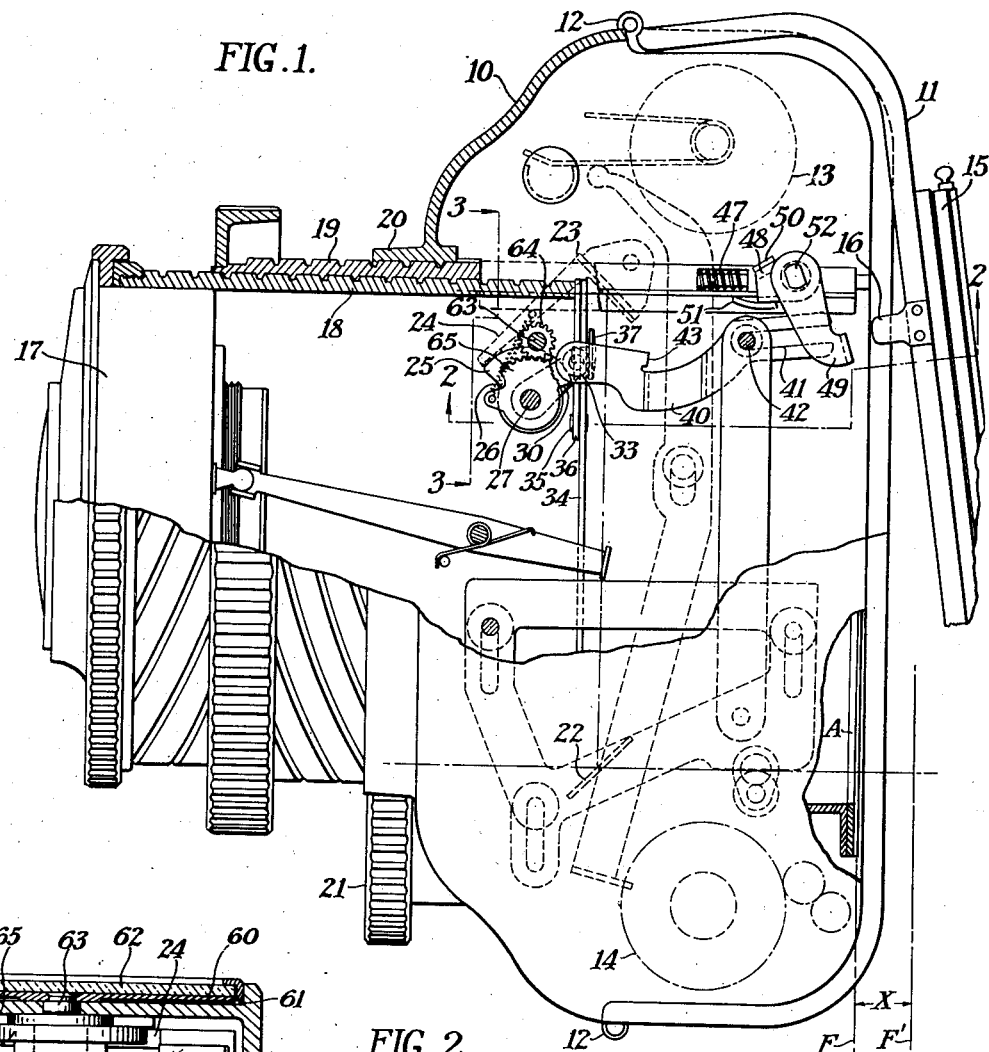

Oct. 12, 1943.  C. W. CRUMRINE  2,331,658
PHOTOGRAPHIC CAMERA AND FOCUSING MECHANISM THEREFOR
Filed Feb. 10, 1941  2 Sheets-Sheet 1

CHESTER W. CRUMRINE
INVENTOR
BY
ATTORNEYS

Oct. 12, 1943.   C. W. CRUMRINE   2,331,658
PHOTOGRAPHIC CAMERA AND FOCUSING MECHANISM THEREFOR
Filed Feb. 10, 1941   2 Sheets-Sheet 2
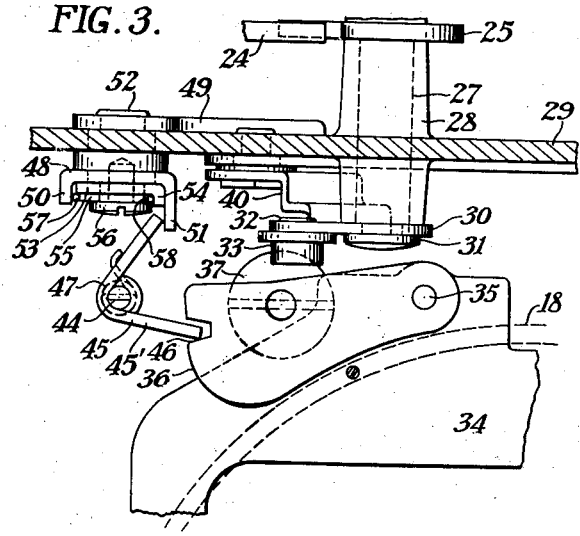
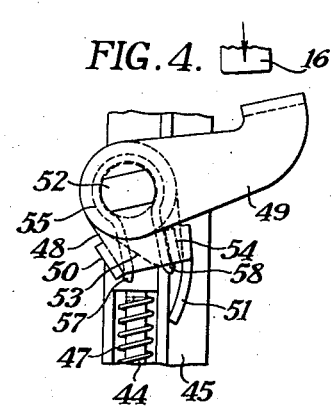
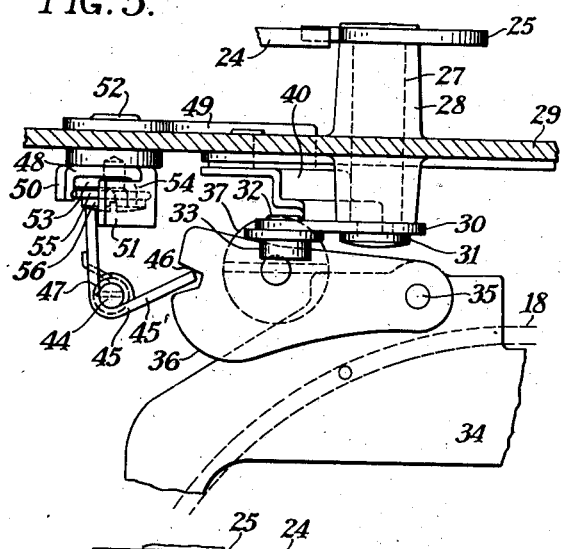
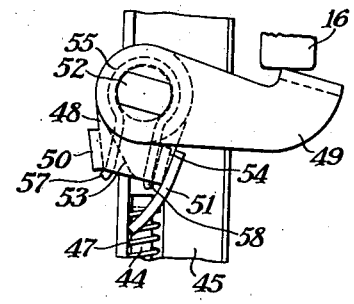
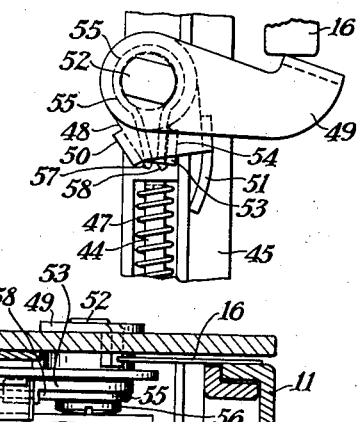
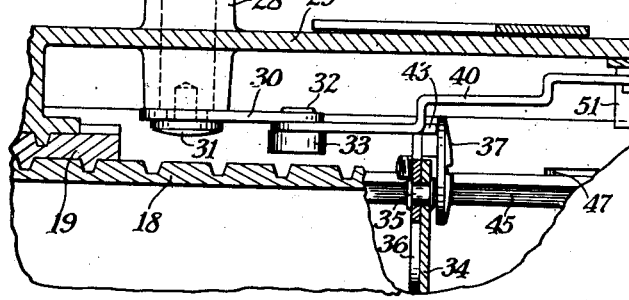
CHESTER W. CRUMRINE
INVENTOR
BY
ATTORNEYS Patented Oct. 12, 1943

2,331,658

UNITED STATES PATENT OFFICE 2,331,658

PHOTOGRAPHIC CAMERA AND FOCUSING MECHANISM THEREFOR

Chester W. Crumrine, Rochester, N. Y., assignor to Eastman Kodak Company, Rochester, N. Y., a corporation of New Jersey Application February 10, 1941, Serial No. 378,234

20 Claims. (Cl. 95—44)

The present invention relates to a focusing roll film camera, and particularly to the focusing mechanism of a roll film camera onto which a cut, or sheet, film adapter back is adapted to be detachably connected so that the focal plane of the film carried thereby is spaced from the normal focal plane of the camera.

One object of the present invention is the provision on a roll film camera having a focusing objective of a focus indicator on the camera body and/or a range finder the adjustable elements of each of which are adapted to be coupled to the objective focusing mechanism to be properly adjusted by an adjustment of said mechanism.

Another object is the provision in a camera of the type described onto which a cut, or sheet, film adapter back is adapted to be detachably connected so that the focal plane of the film carried thereby is spaced from the roll film focal plane, of a coupling between the objective focusing mechanism and the adjustable elements of the focus indicator and range finder which can be readily altered in accordance with the focal plane being used.

A further object is to provide a coupling between the objective focusing mechanism and the adjustable elements of the focus indicator and/or the range finder which will be automatically altered in accordance with the focal plane being used by the attachment, or removal, of the cut film back onto, or from, respectively, the camera body.

And yet another object is the provision of an alterable coupling of the type set forth which is normally moved to, and held in a condition in which it is adapted for use with the roll film focal plane, and means actuated by the attachment of the cut film back onto the camera for shifting said coupling in accordance with the cut film focal plane.

Another object is to provide a coupling altering means which is adapted to be operated by a projection on the adapter back when the latter is placed on the camera, this coupling altering means including a resilient transmission joint permitting a complete operation of one part thereof while another part thereof is held against operation, and for the purpose of preventing the coupling means from being injured by a forced operation of one part thereof while another part is incapable of movement.

Another object of the invention is to so arrange the adjustable members of the focus indicator and range finder that they can be simultaneously operated by a single coupling from the focusing mechanism of the objective.

The novel features that I consider characteristic of my invention are pointed out with particularity in the appended claims. The invention itself, however, both as to its organization and its methods of operation, together with additional objects and advantages thereof, will best be understood from the following description of specific embodiments when read in connection with the accompanying drawings in which, Fig. 1 is a top plan view, partly in section and part in elevation, of a roll film camera including a focus indicator and range finder adjusting coupling constructed in accordance with a preferred embodiment of the present invention, and showing said coupling in its normal position for use with the roll film focal plane and about to be shifted in accordance with the cut film focal plane by the attachment of the cut film back onto the camera, Fig. 2 is an enlarged sectional view taken substantially on line 2—2 of Fig. 1, showing the focus indicator in the top wall of the camera body, and the adjustable member of the range finder, Fig. 3 is an enlarged view taken substantially on line 3—3 of Fig. 1, showing the range finder and focus indicator coupling in its normal position in accordance with the roll film focal plane, Fig. 4 is a partial top plan view of Fig. 3, and showing the resilient transmission joint of the coupling adjusting mechanism in its normal position, Fig. 5 is a view similar to Fig. 3, but showing the coupling shifted to a position in accordance with the cut film focal plane by an attachment of the cut film adapter back onto the camera, Fig. 6 is a plan view similar to Fig. 4 but showing the position of the resilient transmission joint when actuated by the attachment of the cut film back onto the camera, Fig. 7 shows how the resilient transmission joint permits one part of the coupling and shifting mechanism to be operated by attachment of the cut film back onto the camera while another part of said mechanism is held against movement, and Fig. 8 is a sectional view corresponding to Fig. 2, but showing the parts of the coupling in the position they assume when a cut film back is placed on the camera, or when they are altered in accordance with the cut film focal plane.

Like reference characters refer to corresponding parts throughout the drawings.

Briefly, the present invention relates to a focusing roll film camera equipped with a focus indicator on the camera body and/or a range finder each of which is adapted to be coupled to, and adjusted by, the operation of the focusing mechanism. The camera also is adapted to have a cut film adapter back detachably connected thereto so that a cut film can be exposed as well as roll film when desired. As is customary, the focal plane of the cut film is spaced rearwardly of the roll film focal plane so that the coupling between the camera focusing mechanism, focus indicator, and/or the range finder, must be altered in accordance with the difference in the spacing of the roll film and cut film focal planes if the focus indicator and range finder are to operate correctly with both types of film. To take care of this contingency automatically, the present invention provides a separable coupling between the focusing mechanism and the adjustable members of the focus indicator and/or the range finder, and which coupling is automatically altered in accordance with the focal plane being used by the attachment onto, or the removal from, the camera body of the cut film back.

The camera to which the present invention is adapted is shown in the drawings to be of similar design and construction to that illustrated in my copending applications, Serial Numbers 319,304, filed February 16, 1940, and 375,653, and 375,652, filed January 23, 1941. The camera comprises a body 10 to which a separable back 11 of a selected type may be detachably connected by means of separable hinges 12. When roll film is being used in the camera, such film is retained on the supply spool 13 from which it is drawn across the exposure frame A and wound up on a receiving spool 14. The exposure frame A positions the roll of film in the focal plane marked F for exposure purposes.

When cut, or sheet, films are to be used in this camera the separable back 11 includes the guides 15, as shown in Fig. 1, into which a well-known type of film pack may be slid to position the film over an exposure frame, not shown, in the back which lines up with the exposure frame A in the camera body. The back 11 adapted for cut film includes a lug 16, the purpose of which is hereafter clearly set forth, but the camera back for use with roll film does not include this lug as will be clearly understood by those skilled in the art. When cut films are being used they assume the focal plane F' for exposure purposes, and which focal plane is spaced rearwardly of the roll film focal plane F by the distance marked X. It is this spacing X that the coupling for the range finder and focus indicator must be adjusted in accordance with so that these parts will correctly indicate when the correct focus of the lens is obtained for both focal planes.

A shutter and lens assembly shown at 17 is carried at the outer end of a threaded tube 18 which is in turn threaded into a tube 19 that is threaded into an internally threaded collar 20 on the camera body. The tube 18 is held against rotation, but will be moved in or out for focusing purposes by the rotation of tube 19, which may be accomplished by turning a knob 21, through gearing, not shown.

To facilitate focusing, the camera is equipped with a well-known type of range finder which may include a stationary mirror 22 located at one end of the camera body, and a pivoted, or adjustable mirror, 23, located at the opposite end of the camera body, as well known in the art. As is customary with this type of range finder, the adjustable member 23 thereof is coupled to the focusing mechanism to be pivoted in opposite directions as the lens is moved in and out; and when the image picked up and reflected thereby lines up with that received by the stationary mirror 22 the lens is known to be in focus on the subject to be photographed.

For connecting the adjustable member 23 of the range finder to the focusing mechanism the following coupling is provided. An adjusting arm 24, projecting from the support for the member 23 of the range finder, is normally held against the face of a cam 25 by a spring 26 connected at one end to the arm and at the other end to an arm of the gear segment 65 fixed to the post 27, see Fig. 1. The cam 25 is fixed to the post 27 which is rotatably mounted in a bearing 28 integral with a mechanism plate 29 in the camera body. The spring 26 as shown in Fig. 1, normally tends to rotate the post 27 clockwise in addition to holding the arm 24 against the face of the cam. One end of a crank 30 is connected to the lower end of the post 27 by a stud 31, and the other end of the crank has a pin 32 projecting downwardly therefrom and onto the lower end of which is fixed a stop 33. Fixed to the rear end of the inner tube 18 by four screws, as indicated in Figs. 3 and 4, is a frame 34. Pivoted to this frame at 35 is an arm 36 and into which is threaded a large headed screw 37. This arm is normally moved to the lower position shown in Figs. 2 and 3 by a mechanism hereinafter set forth so that the head of the screw 37 is in a position to engage the stop 33. The stop 33 is normally held against the head of the screw 37 by the action of the spring 26 acting on the range finder adjusting mechanism to move the post 27 clockwise; and the screw will be so adjusted in the arm 36 that when the lens is focused at infinity with respect to the roll film focal plane F the stop 33 will be permitted to assume the position shown in Fig. 2, and in which position the post 27 is allowed to rotate clockwise by an amount to insure the range finder indicating an object at infinity as being in focus. When the lens mount is focused outwardly from the position shown in Fig. 2, the post 27 will be rotated counter-clockwise through the engagement of the head of the screw 37 and stop 33 whereby the range finder will be adjusted to indicate when the lens is in focus on any given object.

It will be readily understood by those skilled in the art that when cut films are being used which assume the focal plane F' that the inner lens tube must be moved backwards from the position it assumes when in focus on plane F by a distance X equal to the distance between the two focal planes in order to be in focus on this plane. Accordingly, if the range finder is to indicate the correct focus of the lens with regard to this second focal plane F' the coupling between the range finder adjusting mechanism and the lens mount must be altered to account for this spacing between the focal planes. To this end, an offset lever 40 is connected at one end to pin 32 and extends rearwardly of the camera body. The other end 41 of this offset lever is slotted and slidably engages a headed stud 42 extending downwardly from the mechanism plate 29 in the camera body, see Figs. 2 and 8. This offset lever includes a projection 43, the end of which is spaced rearwardly of stop 33 by an amount equal to the distance X between the focal planes F, F', and against which the head of the screw 37 is adapted to abut when the lens is being used in relation to focal plane F', see Fig. 8. When the lens tube 18 is moved in and out to focus the lens relative to the focal plane F', the screw 37 moving therewith will engage the end of projection 43 to adjust the range finder in accordance with the focusing movement relative to this focal plane. Proper positioning of the stop 33 and projection 43 relative to the focal planes F and F' is determined by the engagement of the stud 42 with the end of the slot in the lever 40.

By referring to Figs. 2 and 8, it will be noticed that the stop 33 and projection 43 are in different planes so that the arm 36 must be pivoted between the two positions shown in Figs. 3 and 5 to alternately engage these two parts. It is desirable that the coupling between the lens focusing mechanism and the range finder adjusting mechanism be altered automatically in accordance with the focal plane being used, and to this end the following structure is provided.

Pivotally mounted on a rod 44 extending rearwardly of the camera body is an elongated angle 45 one arm 45' of which extends into a notch 46 in the arm 36. This angle is normally rotated in a clockwise direction by a coil spring 47 surrounding the rod 44 and fixed at one end to the rod and at the other end to the angle. This spring, therefore, normally tends to rotate the arm 36 to the position shown in Figs. 2 and 3, and in which position the screw 37 thereon is adapted to engage the stop 33 and thereby alter the coupling between the range finder adjusting means and the lens focusing mechanism in accordance with the roll film focal plane F.

The angle 45 is adapted to be rotated counterclockwise to the position shown in Figs. 5 and 8, and in which position the arm 36 is pivoted to move the screw 37 upwardly into the plane of the projection 43, by a pivotal movement of the crank 49 in a clockwise direction, see Figs. 4, 6, and 7, when engaged by the lug 16 on the cut film back in the step of placing this back on the camera body. Since, as will be noted by referring to Fig. 2, it is possible that the cut film back might be placed on the camera body before the lens tube 18 is retracted to move the screw 37 behind the projection 43, it is necessary to have a resilient transmission joint between the angle 45 and the crank 49 so that no part of the mechanism will be injured by placing the cut film back on the camera body before retracting the lens tube 18. To this end, a member 48 having two lugs 50 and 51 depending therefrom is rotatably mounted relative to the stub-shaft 52 to which the crank 49 is fixed, and lug 51 thereof is adapted to engage the uppermost arm of the angle 45. Fixed to the lower end of the stub-shaft 52 to rotate therewith is a member 53 having a depending lug 54. A U-shaped spring 55 is held onto the lower end of the stub-shaft 52 by a screw 56, and one arm 57 of the spring is adapted to engage the lug 50 on the member 48, while the other arm 58 of the spring engages lug 54 on member 53. Thus when the stub-shaft 52 is rotated by a pivotal movement of crank 49, the member 48 will be rotated by the joint including spring 55 to rotate the angle 45 counterclockwise to shift the arm 36 upwardly and the screw 37 thereon into the plane of the projection 43. If, however, the arm 36 and screw 37 thereon are in the position shown in Fig. 2 and cannot be raised, then the spring 55 will be compressed to the condition shown in Fig. 7 by placement of the cut film back onto the camera, and the spring 55 will tend to raise the arm 36 without putting sufficient pressure on the mechanism to injure any part thereof. If the lens tube 18 is now moved rearwardly in accordance with the different spacing X of the two focal planes, the screw 37 will be moved behind the projection 43 and the resilient force of the compressed spring 55 will come into action to immediately snap the arm 36 upwardly to position the screw 37 in position to engage the projection 43 when focusing of the lens commences.

It will, therefore, be understood that when the camera is filled with a roll of film the arm 36 will normally be moved clockwise to move the screw 37 thereon into a position to engage the stop 33, and which stop is properly located in accordance with the roll film focal plane F. On the other hand, when the cut film back having the projection 16 is placed on the camera, the arm 36 will automatically be moved, or placed under a resilient force to be moved, clockwise and into a position where the screw 37 will be adapted to engage the end of the projection 43 which is definitely located relative to the cut film focal plane F'. Then by means of this range finder coupling and altering means therefor, the range finder is adapted to be properly adjusted by a focusing of the camera lens and in accordance with either focal plane being used.

This camera is also provided with a focus indicator which is on the camera body and which is adapted to be coupled to and operated by the focusing mechanism of the camera. This focus indicator may be of the type shown and described in my above noted copending application Serial No. 319,304, filed February 16, 1940, and to which application reference can be had for the location of the same on the camera body. As clearly shown in Fig. 1 of my noted copending application, and Fig. 2 of this application, this focus indicator may comprise a rotatable disk 60 seated in a recess 61 in the top of the camera body and beneath a glass plate 62; and which disk is adapted to bear an index point for cooperating with a circularly arranged stationary focus scale. This rotatable disk 60 must be coupled to the lens focusing mechanism and rotated by a focusing adjustment of the same, and it will be appreciated that this coupling must be alterable so that the focus indicator will operate in accordance with either of the focal planes being used.

To this end, I arranged the rotatable disk 60 of the focus indicator so that it can be operated by substantially the same coupling as the range finder. Referring to Figs. 1 and 2, the rotatable disk 60 is fixed to a shaft 63 bearing a pinion 64. This pinion 64 is adapted to be engaged by the aforementioned segment gear 65 which is fixed to the post 27 in superposed relation with cam 25 which adjusts the range finder. Due to this arrangement of parts the focus indicator is coupled to the lens focusing mechanism by the same coupling used for adjusting the range finder, and the coupling for the focus indicator is alterable simultaneously with that of the range finder coupling in the manner set forth above. While I have shown the camera equipped with both a range finder and focusing indicator of the type set forth which can be coupled to the focusing mechanism by the same alterable coupling means, it will be readily understood that the camera could be equipped with only a range finder or only a focus indicator, and have the individual members adjusted by the alterable coupling disclosed.

Although I have shown and described certain specific embodiments of my invention, I am fully aware that many modifications thereof are possible. My invention, therefore, is not to be restricted except insofar as is necessitated by the scope of the appended claims.

Having thus described my invention, what I claim is new and desire to secure by Letters Patent of the United States is:

1. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a range finder having a part movable for adjusting its setting, a focus indicator on said camera body including a movable member, an operative coupling between said movable member of said focusing means, the movable part of said range finder, and the movable member of said focus indicator, whereby said range finder and focus indicator are adapted to be adjusted in accordance with the focusing movement of said objective, said coupling being alterable and including two different points of connection spaced in accordance with the spacing of said focal planes, whereby said range finder and indicator are adapted to be moved in accordance with the focusing movement of the objective relative to one or the other of the focal planes, and means for connecting said coupling at either of said different points depending upon the focal plane being used.

2. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a range finder having a part movable for adjusting its setting, a focus indicator on said camera body including a movable member, an operative coupling between said movable member of said focusing means, the movable part of said range finder, and the movable member of said focus indicator, whereby said range finder and focus indicator are adapted to be adjusted in accordance with the focusing movement of said objective, said coupling being alterable and including two different points of connection spaced in accordance with the spacing of said focal planes, whereby said range finder and indicator are adapted to be moved in accordance with the focusing movement of the objective relative to one or the other of the focal planes, and means actuated by attachment of said separate exposure frame onto, and detachment of the same frame from, said camera body for shifting said coupling between said two different points of connection in accordance with that focal plane being used.

3. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a range finder having a part movable for adjusting its setting, a focus indicator on said camera body including a movable member, an operative coupling between said movable member of said focusing means, the movable part of said range finder, and the movable member of said focus indicator, whereby said range finder and focus indicator are adapted to be adjusted in accordance with the focusing movement of said objective, said coupling being alterable and including two different points of connection spaced in accordance with the spacing of said focal planes, whereby said range finder and indicator are adapted to be moved in accordance with the focusing movement of the objective relative to one or the other of the focal planes, means normally acting on said coupling to connect it at the one of said two points of connection in accordance with the given focal plane of the camera, and means actuated by the attachment of said separate exposure frame onto said camera for shifting said coupling to said second point of connection in accordance with the position of the focal plane of said separate exposure frame.

4. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a range finder having a part movable for adjusting its setting, a focus indicator on said camera body including a movable member, an operative coupling between said movable member of said focusing means, the movable part of said range finder, and the movable member of said focus indicator, whereby said range finder and focus indicator are adapted to be adjusted in accordance with the focusing movement of said objective, said coupling being alterable and including two different points of connection spaced in accordance with the spacing of said focal planes, said alterable two point connection comprising a pair of abutments spaced in accordance with the spacing of said focal planes, whereby said range finder and indicator are adapted to be moved in accordance with the focusing movement of the objective relative to one or the other of the focal planes, a stop adapted to engage either one of said abutments and movable between two positions in each of which it is adapted to engage a different one of said two abutments, and means controlled by the attachment of said separate exposure frame for moving said stop between its two positions whereby it is adapted to engage the abutment corresponding with the focal plane being used.

5. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a focus indicator on said camera body including a movable part, an operative coupling between said movable member of said focusing means and the movable part of said focus indicator whereby the focus indicator is adapted to be adjusted in accordance with the focusing movement of said objective, said coupling being alterable and including two different points of connection spaced in accordance with the spacing of said focal planes, whereby said indicator is adapted to be moved in accordance with the focusing movement of the objective relative to one or the other of the focal planes, and means for connecting said coupling at either of said different points depending upon the focal plane being used.

6. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a focus indicator on said camera body including a movable part, an operative coupling between said movable member of said focusing means and the movable part of said focus indicator whereby the focus indicator is adapted to be adjusted in accordance with the focusing movement of said objective, said coupling being alterable and including two different points of connection spaced in accordance with the spacing of said focal planes, whereby said indicator is adapted to be moved in accordance with the focusing movement of the objective relative to one or the other of the focal planes, and means actuated by attachment of said separate exposure frame onto, and detachment of the same from, said camera body for shifting said coupling between said two points of connection in accordance with the focal plane being used.

7. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a focus indicator on said camera body including a movable part, an operative coupling between said movable member of said focusing means and the movable part of said focus indicator whereby the focus indicator is adapted to be adjusted in accordance with the focusing movement of said objective, said coupling being alterable and including two different points of connection spaced in accordance with the spacing of said focal planes, whereby said indicator is adapted to be moved in accordance with the focusing movement of the objective relative to one or the other of the focal planes, means normally acting on said coupling to connect it at the one of said two points of connection in accordance with the given focal plane of the camera, and means actuated by the attachment of said separate exposure frame onto said camera for shifting said coupling to said second point of connection in accordance with the position of the focal plane of said separate exposure frame.

8. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a focus indicator on said camera body including a movable part, an operative coupling between said movable member of said focusing means and the movable part of said focus indicator whereby the focus indicator is adapted to be adjusted in accordance with the focusing movement of said objective, said coupling being alterable and including two different points of connection spaced in accordance with the spacing of said focal planes, whereby said indicator is adapted to be moved in accordance with the focusing movement of the objective relative to one or the other of the focal planes, said alterable two point connection comprising a pair of abutments spaced in accordance with the spacing of said focal planes, a stop adapted to engage either one of said abutments and movable between two positions in each of which it is adapted to engage a different one of said two abutments, and means controlled by the attachment of said separate exposure frame for moving said stop between its two positions whereby it is adapted to engage the abutment corresponding with the focal plane being used.

9. In a camera including an exposure frame at a given focal plane across which a film may lie to be exposed, the combination with a camera body, a separate exposure frame across which a film may lie to be exposed and adapted to be detachably mounted on said camera body whereby the film positioned thereby will lie in a focal plane spaced from the given focal plane of the camera, an objective, means for moving said objective axially and into focus with either of said focal planes, means for focusing the objective relative to either focal plane and including a part movable along the optical axis of the objective, a focus indicator on said camera body including a movable index, means for coupling said movable part of the focusing means and said movable index whereby said index is adapted to be moved in accordance with the focusing movement of the objective relative to either of said focal planes, said coupling means including a linkage for moving said index, a pair of abutments on a part of said linkage and spaced apart in accordance with the spacing between said focal planes, a stop carried by said part of the focusing means and movable between two positions in each of which it is adapted to engage a different one of said abutments, and means for moving said stop between said two positions to engage the abutment corresponding to the focal plane being used.

10. In a camera including an exposure frame at a given focal plane across which a film may lie to be exposed, the combination with a camera body, a separate exposure frame across which a film may lie to be exposed and adapted to be detachably mounted on said camera body whereby the film positioned thereby will lie in a focal plane spaced from the given focal plane of the camera, an objective, means for moving said objective axially and into focus with either of said focal planes, means for focusing the objective relative to either focal plane and including a part movable along the optical axis of the objective, a focus indicator on said camera body including a movable index, means for coupling said movable part of the focusing means and said movable index whereby said index is adapted to be moved in accordance with the focusing movement of the objective relative to either of said focal planes, said coupling means including a linkage for moving said index, a pair of abutments on a part of said linkage and spaced apart in accordance with the spacing between said focal planes, a stop carried by said part of the focusing means and movable between two positions in each of which it is adapted to engage a different one of said abutments, means on said camera body normally moving said stop to the one of said two positions in which it is adapted to engage the abutment positioned in accordance with said given focal plane, and means operated by the attachment of the separate exposure frame to the camera body for moving said stop to its second position whereby it is adapted to engage the other abutment positioned in accordance with the focal plane thereof.

11. In a camera including an exposure frame at a given focal plane across which a film may lie to be exposed, the combination with a camera body, a sheet film adapter adapted to be detachably mounted on the camera body whereby the sheet film is held in a focal plane spaced from the roll film focal plane, an objective, an objective mount for said objective screw threaded into said camera for focusing said objective relative to each of said focal planes and for moving the objective into focus with either of said focal planes, a focus indicator on said camera body including a movable index, means for coupling said objective mount to said movable index whereby the latter will be moved in accordance with the focusing movement of the objective relative to either of said focal planes, said coupling means including a link directly connected to the movable index and having two abutments thereon spaced apart in accordance with the spacing of said focal planes, a stop movable with said objective and adapted to engage either one of said abutments to move said link, said stop movable between two positions in each of which it is adapted to engage a different one of said abutments, an operating mechanism on said camera body engaging said stop to move it between its two positions, and including a control arm adapted to be engaged and moved by said sheet film adapter when the same is placed on or removed from said camera body whereby the position of said stop, and the connection of said coupling, depends upon the attachment or detachment of said separate exposure frame relative to said camera body.

12. In a camera including an exposure frame at a given focal plane across which a film may lie to be exposed, the combination with a camera body, a sheet film adapter adapted to be detachably mounted on the camera body whereby the sheet film is held in a focal plane spaced from the roll film focal plane, an objective, an objective mount for said objective screw threaded into said camera for focusing said objective relative to each of said focal planes and for moving the objective into focus with either of said focal planes, a focus indicator on said camera body including a movable index, means for coupling said objective mount to said movable index whereby the latter will be moved in accordance with the focusing movement of the objective relative to either of said focal planes said coupling means including a link directly connected to the movable index having two abutments thereon spaced apart in accordance with the spacing of said focal planes, a stop movable with said objective and adapted to engage either one of said abutments to move said link, said stop movable between two positions in each of which it is adapted to engage a different one of said abutments, an operative mechanism on said camera body engaging said stop to move it between its two positions, and including means normally moving said stop to the position where it is adapted to engage the abutment corresponding to the roll film focal plane, and a movable control arm adapted to be engaged and moved by said sheet film adapter when it is placed on the camera whereby said operating mechanism tends to move said stop from its normal position, said operating mechanism including a resilient connection permitting full movement of said control arm while said stop is incapable of movement.

13. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a range finder on said camera body including a part movable for adjusting its setting, an operative coupling between said movable member of said focusing means and said movable part of the range finder whereby the range finder is adapted to be adjusted in accordance with the focusing movement of said objective, said coupling being alterable and including two different points of connection spaced in accordance with the spacing of said focal planes, whereby said range finder is adapted to be moved in accordance with the focusing movement of the objective relative to one or the other of the focal planes, and means for connecting said coupling at either of said different points depending upon the focal plane being used.

14. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a range finder on said camera body including a part movable for adjusting its setting, an operative coupling between said movable member of said focusing means and said movable part of the range finder whereby the range finder is adapted to be adjusted in accordance with the focusing movement of said objective, said coupling being alterable and including two different points of connection spaced in accordance with the spacing of said focal planes, whereby said range finder is adapted to be moved in accordance with the focusing movement of the objective relative to one or the other of the focal planes, and means actuated by attachment of said separate exposure frame onto, and detachment of the same from, said camera body for shifting said coupling between said two points of connection in accordance with the focal plane being used.

15. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a range finder on said camera body including a part movable for adjusting its setting, an operative coupling between said movable member of said focusing means and said movable part of the range finder whereby the range finder is adapted to be adjusted in accordance with the focusing movement of said objective, said coupling being alterable and including two different points of connection spaced in accordance with the spacing of said focal planes, whereby said range finder is adapted to be moved in accordance with the focusing movement of the objective relative to one or the other of the focal planes, means normally acting on said coupling to connect it at the one of said two points of connection in accordance with the given focal plane of the camera, and means actuated by the attachment of said separate exposure frame onto said camera for shifting said coupling to said second point of connection in accordance with the position of the focal plane of said separate exposure frame.

16. In a camera including an exposure frame at a given focal plane across which a film may lie to be exposed, the combination with a camera body, an objective, means for focusing the objective and including a movable member, a separate exposure frame across which a film may lie to be exposed and adapted to be detachably connected to said camera body whereby the film positioned thereby will lie in a focal plane spaced from the given focal plane of the camera, a range finder on said camera body including a part movable for adjusting its setting, an operative coupling between said movable member of said focusing means and said movable part of the range finder whereby the range finder is adapted to be adjusted in accordance with the focusing movement of said objective, said coupling being alterable and including two different points of connection spaced in accordance with the spacing of said focal planes, said alterable two point connection comprising a pair of abutments spaced in accordance with the spacing of said focal planes, whereby said range finder is adapted to be moved in accordance with the focusing movement of the objective relative to one or the other of the focal planes, a stop adapted to engage either one of said abutments and movable between two positions in each of which it is adapted to engage a different one of said two abutments, and means controlled by the attachment of the separate exposure frame for moving said stop between its two positions whereby it is adapted to engage the abutment corresponding with the focal plane being used.

17. In a camera including an exposure frame at a given focal plane across which a film may be to be exposed, the combination with a camera body, a separate exposure frame across which a film may be to be exposed and adapted to be detachably mounted on said camera body whereby the film positioned thereby will be in a focal plane spaced from said given focal plane of the camera, an objective, means for moving said objective axially into focus with either of said focal planes, means for focusing the objective relative to either focal plane and including a part movable along the optical axis of the objective, a range finder on said camera body having a part movable for adjusting its setting, means for coupling said movable part of the range finder and said movable part of the focusing means whereby said range finder is adapted to be adjusted in accordance with the focusing movement of the objective relative to either of said focal planes, said coupling means including a linkage for moving said movable part of the range finder, a pair of abutments on a part of said linkage and spaced apart in accordance with the spacing between said focal planes, a stop carried by said part of the focusing means and movable between two positions in each of which it is adapted to engage a different one of said abutments, and means for moving said stop between said two positions to engage the abutment corresponding to the focal plane being used.

18. In a camera including an exposure frame at a given focal plane across which a film may be to be exposed, the combination with a camera body, a separate exposure frame across which a film may lie to be exposed and adapted to be detachably mounted on said camera body whereby the film positioned thereby will be in a focal plane spaced from said given focal plane of the camera, an objective, means for moving said objective axially into focus with either of said focal planes, means for focusing the objective relative to either focal plane and including a part movable along the optical axis of the objective, a range finder on said camera body having a part movable for adjusting its setting, means for coupling said movable part of the range finder and said movable part of the focusing means whereby said range finder is adapted to be adjusted in accordance with the focusing movement of the objective relative to either of said focal planes, said coupling means including a linkage for moving said movable part of the range finder, a pair of abutments on a part of said linkage and spaced apart in accordance with the space between said focal planes, a stop carried by said part of the focusing means and movable between two positions in each of which it is adapted to engage a different one of said abutments, means on said camera body normally moving said stop to the one of said two positions in which it is adapted to engage the abutment positioned in accordance with said given focal plane, and means operated by the attachment of the separate exposure frame to the camera body for moving said stop to its second position whereby it is adapted to engage the other abutment positioned in accordance with the focal plane thereof.

19. In a camera including an exposure frame at a given focal plane across which a roll film may be to be exposed, the combination with a camera body, a sheet film adapter adapted to be detachably mounted on the camera body whereby the sheet film is held in a focal plane spaced from the roll film focal plane, an objective, an objective mount for said objective screw threaded into said camera for focusing said objective relative to said focal planes and for moving the objective into focus with either of said focal planes, a range finder on said camera body having a movable part for adjusting its setting, means for coupling said objective mount to said movable range finder part whereby the latter will be moved in accordance with the focusing movement of the objective relative to either of said focal planes, said coupling means including a link directly connected to the movable range finder part and having two abutments thereon spaced apart in accordance with the spacing of said focal planes, a stop movable with said objective and adapted to engage either one of said abutments to move said link, said stop movable between two positions in each of which it is adapted to engage a different one of said abutments, an operating mechanism on said camera body engaging said stop to move it between its two positions, and including a control arm adapted to be engaged and moved by said sheet film adapter when the same is placed on, or removed from, said camera body, whereby the position of said stop, and the connection of said coupling depends upon the attachment or detachment of said separate sheet film adapter relative to said camera body.

20. In a camera including an exposure frame at a given focal plane across which a roll film may be to be exposed, the combination with a camera body, a sheet film adapter adapted to be detachably mounted on the camera body whereby the sheet film is held in a focal plane spaced from the roll film focal plane, an objective, an objective mount for said objective screw threaded into said camera for focusing said objective relative to said focal planes and for moving the objective into focus with either of said focal planes, a range finder on said camera body having a movable part for adjusting its setting, means for coupling said objective mount to said movable range finder part whereby the latter will be moved in accordance with the focusing movement of the objective relative to either of said focal planes, said coupling means including a link directly connected to the movable range finder part and having two abutments thereon spaced apart in accordance with the spacing of said focal planes, a stop movable with said objective and adapted to engage either one of said abutments to move said link, said stop movable between two positions in each of which it is adapted to engage a different one of said abutments, an operating mechanism on said camera body engaging said stop to move it between its two positions, and including means normally moving said stop to the position where it is adapted to engage the abutment corresponding to the roll film focal plane, and a movable control arm adapted to be engaged and moved by said sheet film adapter when it is placed on the camera whereby said operating mechanism tends to move said stop from its normal position, said operating mechanism including a resilient connection permitting full movement of said control arm while said stop is incapable of movement.

CHESTER W. CRUMRINE.